United States Patent [19]
Swanson

[11] Patent Number: 5,374,179
[45] Date of Patent: Dec. 20, 1994

[54] MULTI-TEMPERATURE FILM DIE

[75] Inventor: David W. Swanson, Escondido, Calif.

[73] Assignee: Hewlett-Packard Company, Palo Alto, Calif.

[21] Appl. No.: 58,729

[22] Filed: May 3, 1993

[51] Int. Cl.⁵ .................. B29C 35/00; B29C 51/42
[52] U.S. Cl. ........................ 425/384; 156/69;
156/251; 156/290; 156/308.4; 156/515;
156/530; 264/163; 264/327; 264/519; 264/522;
425/387.1; 425/407
[58] Field of Search ............. 425/292, 384, 388, 407,
425/517, 519, 520, 521, 304, 387.1; 264/163,
519, 521, 522, 327; 53/453, 559, 561; 493/190;
156/69, 251, 290, 308.4, 515, 530

[56] References Cited

U.S. PATENT DOCUMENTS

| | | | |
|---|---|---|---|
| 2,589,022 | 3/1952 | Page, Jr. et al. | 264/163 |
| 2,641,094 | 6/1953 | Starzyk | 493/190 |
| 3,041,669 | 7/1962 | Marshall et al. | 425/292 |
| 3,340,714 | 9/1967 | Pohl et al. | 425/384 |
| 3,932,097 | 1/1976 | Press | 425/407 |
| 4,005,967 | 2/1977 | Ayres et al. | 425/384 |
| 4,018,552 | 4/1977 | Prast et al. | 425/384 |
| 4,130,619 | 12/1978 | Held | 425/407 |
| 4,140,046 | 2/1979 | Marbach | 156/515 |
| 4,256,024 | 3/1981 | Carlisle | 156/251 |
| 4,511,322 | 4/1985 | Jakobsen et al. | 425/384 |
| 4,545,844 | 10/1985 | Buchanan | 156/251 |
| 4,563,145 | 1/1986 | de Meij | 425/407 |
| 4,685,274 | 8/1987 | Garwood | 53/559 |
| 4,740,342 | 4/1988 | Menard et al. | 425/388 |
| 4,927,591 | 5/1990 | Nilsson | 264/521 |
| 4,999,081 | 3/1991 | Buchanan | 156/251 |
| 5,092,208 | 3/1992 | Rosa-Miranda | 425/292 |
| 5,158,132 | 10/1992 | Guillemot | 425/407 |
| 5,164,142 | 11/1992 | Simmonds | 425/384 |

Primary Examiner—Jay H. Woo
Assistant Examiner—Joseph Leyson
Attorney, Agent, or Firm—E. F. Oberheim

[57] ABSTRACT

A heated film die for the fabrication of plastic containers such as bags, envelopes, balloons, bladders, etc.. The die is an integrated sectionalized structure having independent, adjacent, electrically heated, temperature regulated, die sections which are maintained at different temperatures, for performing, simultaneously, two or more of operations such as, cutting, staking and forming, in plastic container fabrication. A lower temperature heat sink between adjacent die sections provides thermal isolation between the die sections.

7 Claims, 3 Drawing Sheets

MULTI-TEMPERATURE FILM DIE

TECHNICAL FIELD

This invention relates generally to heated dies for fabricating articles of plastic sheet material, and more particularly, to a sectionalized die structure having adjacent zones of differing temperatures which are thermally isolated by a heat sink.

BACKGROUND OF THE INVENTION

The fabrication of articles of plastic sheet materials such as balloons, bags, bladders and other such types of containers, using heated dies for shaping the plastic sheet, involves thermal cutting, staking and forming operations which are performed at different temperatures. Because of the different temperatures, the use of either a single-piece die or a sectionalized die for performing these operations simultaneously is not obviously indicated, particularly where the different hot die functions must occupy positions in close proximity to one another, because of heat energy transferred among the die sections by thermal conductivity, radiation, and convection. Staking and cutting operations are usually closely spaced, being performed at the peripheral edge of a container. With some films the staking temperatures may be 300° F.–400° F. and the adjacent cutting or trimming temperatures may be 600° F. In another area of the die adjacent staking and film blowing (or vacuum forming or push forming) operations may be required. Here again, there are significant differences in temperatures, the film blowing temperature usually being higher than the staking temperature. The thermal isolation of these different temperature zones, either in a single piece or integrated die structure, requires provision for blocking thermal energy flow from the higher temperature zones into the lower temperature zones to prevent overheating a lower temperature zone which will cause a malfunction.

SUMMARY OF THE INVENTION

The problems with achieving thermal isolation in an integrated multi-temperature film die are solved according to this invention by providing a sectionalized die structure comprising individual, electrically heated, physically separated die sections, integrated by a substrate having low thermal conductivity, in which thermal isolation of the die sections is provided by heat sinks disposed between and spaced from the die sections. The heat sinks do not shape the plastic sheet. For stable temperature control, a heat sink between the adjacent hot die sections is required that stays below both hot die temperatures at all times. The heat sink; of the circulating coolant type is of sufficient thermal capacity to "pump" or to conduct any heat it receives from the adjacent hot dies away from the dies by maintaining a temperature below the hot die temperatures. The heat sink thereby prevents the hotter die from overheating the cooler die. The hot die sections are heated and controlled by standard electrical temperature controls. Such controls can only add heat through an electrical heater element.

BRIEF DESCRIPTION OF THE DRAWINGS

The invention will be better understood by reference to the following specification when considered in conjunction with the accompanying drawings in which.

BEST MODE FOR PRACTICING THE INVENTION

Figure 1:
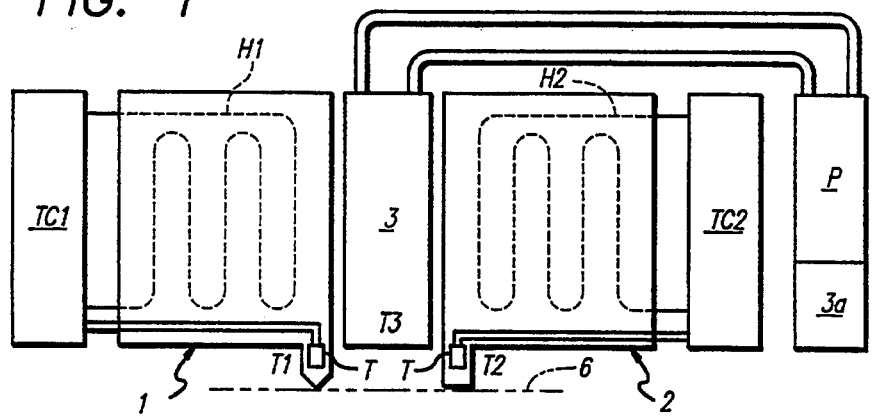
FIG. 1 schematically illustrates a heated film die structure embodying the principles of this invention.

The die structure of FIG. 1 is a sectionalized die structure comprising die sections 1 and 2. These die sections are electrically heated by means of heater elements H1 and H2 respectively. The heating elements H1 and H2, are controlled by temperature control devices TC1 and TC2 which are not detailed since their principles and implementation are well known. Temperature regulation of the respective die sections by means of control of the current provided to the respective electrical heating elements H1 and H2 is provided in a temperature feedback control arrangement involving the temperature sensors T, such as temperature sensitive diodes or thermocouples. These temperature sensing diodes T are electrically connected to the temperature control systems TC1 and TC2 to provide electrical indications of the actual temperatures of the dies at the location where the work function of that die section is performed, such as the die tips 1a and 2a of the sections 1 and 2, respectively. This feedback of an electrical signal proportional to the working temperature of the die provides close temperature regulation.

Figure 6:
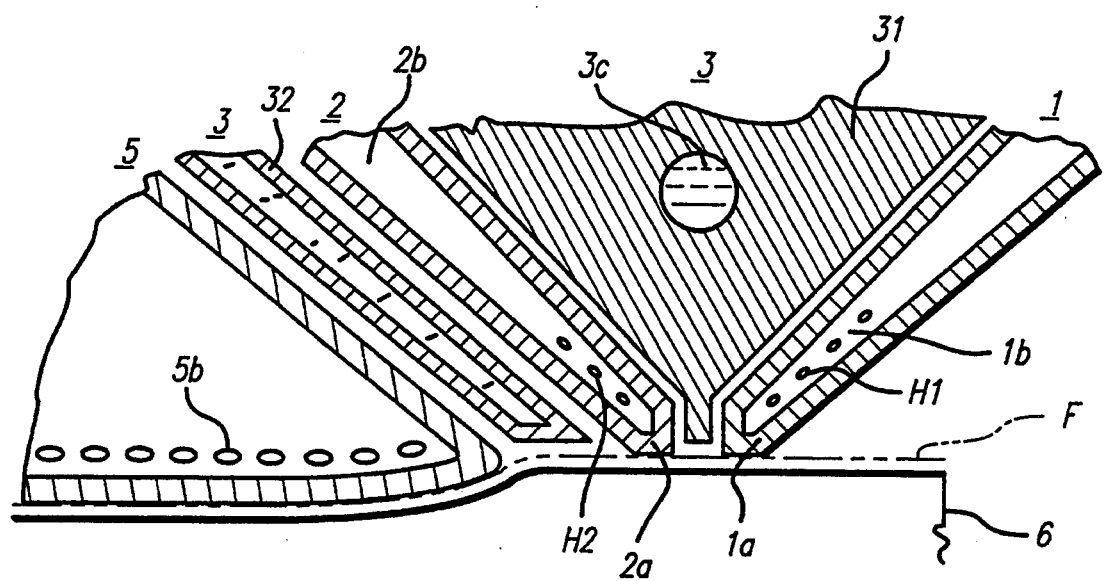
FIG. 6 is a cross-section of one type of hot die structure, for implementing simultaneous cutting, staking and forming operations.
Figure 8:
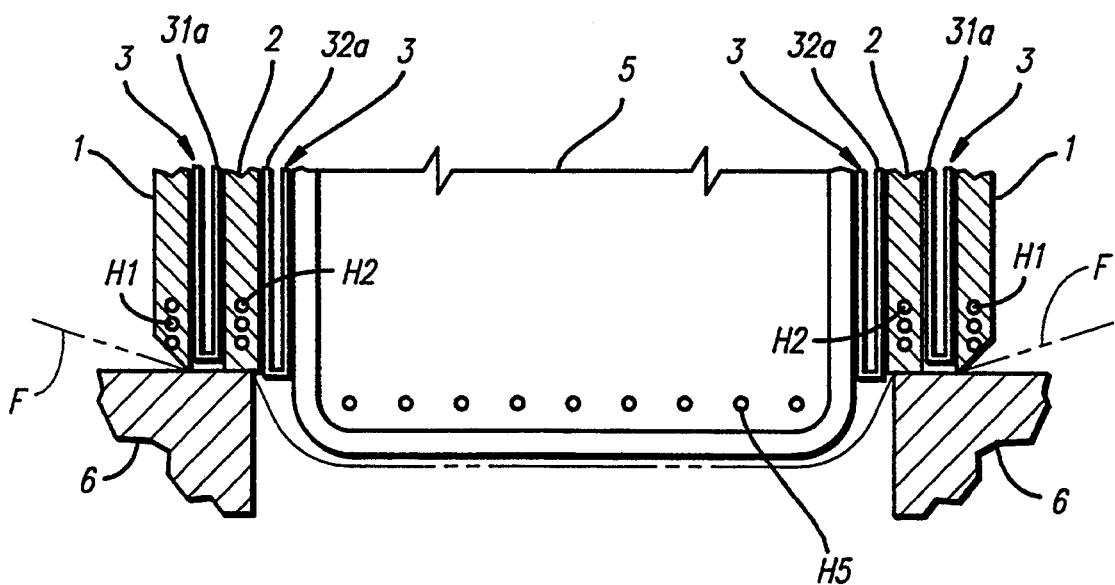

The heating elements H1 and H2 are shown as distributed throughout the die sections. The location of these heating elements in the individual dies is a matter of design. For example, in some structural designs, as seen in FIGS. 6 and 8, the heating elements are in the die tips. Alternatively, the heating elements may be embedded closely adjacent to the tips. Both of these last named heating element locations confine the heat in smaller volumes of the die sections, ending to reduce the heat load to be handled by the heat sinks. The die sections 1 and 2 are schematically illustrated and are not to scale. Cutting and staking operations are performed by the die sections 1 and 2, respectively. In this respect, the working tip 1a of the die section 1 is pointed to provide a heated cutting edge for the plastic film material which is compressed thereagainst as the die is lowered into position on the film. The working tip 2a of the die section 2 is illustrated as a flat face which is used for a staking operation, for example. In those illustrations discussed in the Background of the Invention, it will be recalled that the temperature at the cutting edge of the tip 1a and, hence, of theft die section, is higher than that at the tip 2a and the die section 2, where a staking operation is to be performed. With a die structure of the type described, both a cutting and a staking operation are achieved simultaneously when the die engages the material upon which the work function is to be performed. The base 6 against which the hot die structure operates and which of course will support the plastic film which is to be worked upon, is shown only as a dash dot line to simplify the illustration.

Figure 2:
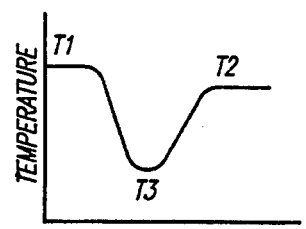
FIG. 2 illustrates a typical temperature profile for the hot die structure of FIG. 1.

Since the die sections 1 and 2 are necessarily maintained at different temperatures to perform their respective functions, it is important that these temperatures be carefully controlled. The die sections, being in close proximity to one another, present problems in this respect due to thermal energy transfer. To minimize heat transfer between the die sections 1 and 2 and to provide thermal isolation therebetween, a heat sink, generally designated 3 is disposed between and spaced from the adjacent die sections 1 and 2. This heat sink is maintained at a temperature T3 below that of either of the temperatures T1 and T2 of the hot die tips 1a and 2a respectively. FIG. 2 illustrates the temperature profile for this die structure in which the temperature T1, measured on the ordinate scale, is higher than the temperature T2, and the temperature T3 is lower than either of these temperatures. Thus, by providing a heat sink 3 at a lower temperature than die tips 1a and 2a, respectively, and providing sufficient heat sink capacity to conduct heat energy away from the tips 1a and 2a respectively, it is possible to utilize a temperature control system, TC1 or TC2, of the type which provides only the addition of heat energy to maintain a required stabilized hot die temperature.

The heat sink 3 is illustrated schematically. A cooling fluid is pumped to and from the heat sink 3 from a fluid pump P. The heat sink loop may include a heat exchange device 3a in the coolant return line or adjacent the pump P for removing heat from the coolant. By pumping coolant through the heat sink 3, at the required temperature and volume rate, it is possible to provide a heat absorbing capacity at the heat sink T3, commensurate with the rate at which heat energy is generated, to minimize heat energy transfer between the die tips 1a and 2a.

Figure 3:
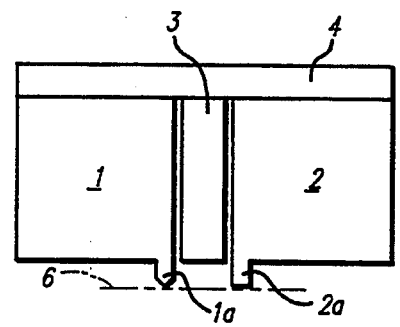
FIGS. 3, 4 and 5 depict profiles of differing hot die structural configurations.
Figure 4:
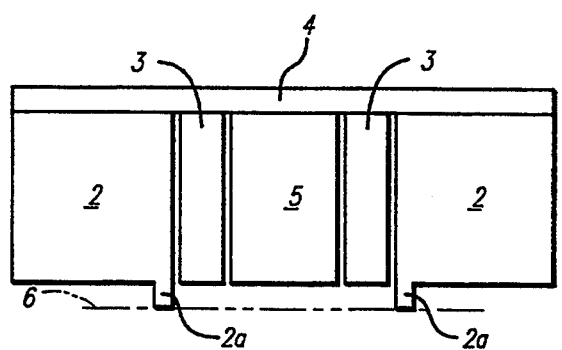
Figure 5:
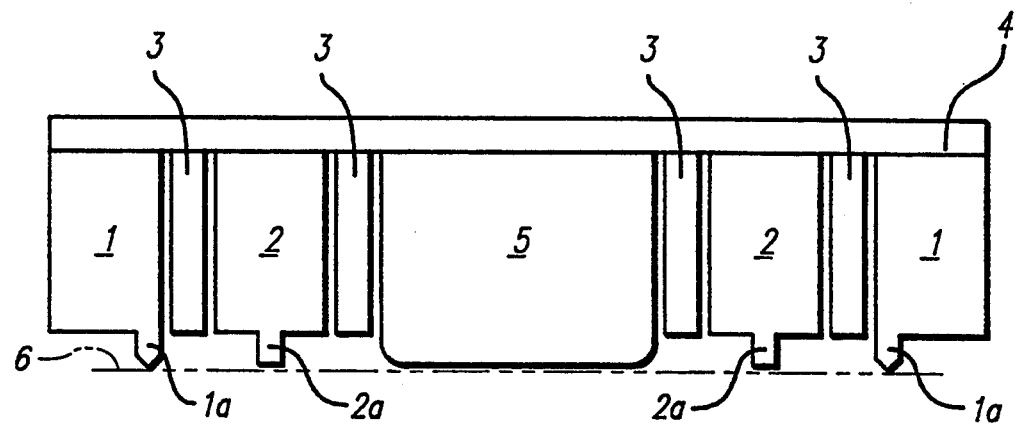

FIGS. 3, 4 and 5 show differing die configurations for simultaneously performing differing combinations of operations of the type which are typically required in forming articles such as containers, from plastic films. All of these die structures comprise the sectionalized die parts. These sectionalized die parts are integrated by means of a substrate with low thermal conductivity. Ceramic materials are suitable for this purpose, for example.

Reviewing these figures, it will be observed that FIG. 3 is substantially a duplicate of FIG. 1, comprising the cutting and staking die sections 1 and 2 and the heat sink 3, all of which are integrated by a substrate 4 and cooperate with a base 6.

FIG. 4 shows a different configuration in which only staking and forming operations are involved. The die section which performs the forming operation is designated 5. It is disposed between the staking die sections 2. The die sections are separated by respective heat sinks 3 and all of the sections are integrated by a substrate 4 of low thermal conductivity. The forming die section 5 is necessarily maintained at a temperature which is different from that of the die sections 2. As is well known, plastic materials are frequently formed by blowing or vacuum forming techniques in the presence of heat at which the necessary plastic flow of the material may take place. The shape is determined by the shape of the face of the hot die section 5, as seen in FIG. 4. Thus the structural configuration of the die of FIG. 4 may be arranged to provide marginal or peripheral staking and sealing of a pair of die films at the tips 2a respectively with a forming operation performed therebetween. With such a structure, balloons or other sealed containers or envelopes may be formed.

The configuration of the die structure of FIG. 5 adds the marginal or peripheral cutting operation to the staking and forming operations described in FIG. 4, in the provision of the cutting die sections 1 at the opposite sides of the die as shown. Again, heat sinks 3 are provided between the staking and cutting die sections 1 and 2 respectively at each side of the die structure depicted. As before, this die structure is integrated by means of a substrate 4 of low thermal conductivity. A convex face is provided on the die section 5. Rather than vacuum or blowing forming as in FIG. 4, stretch forming must be required. Such a stretch forming operation, again involving plastic flow of the material when heated, is provided by the inner face of the die section 5.

FIG. 6 is a cross-sectional view of a die structure of the type schematically depicted in FIG. 5, illustrating some details of a structural design depicting the presently known best mode for practicing the invention. The sectionalized structure depicted is for one side of a die of the type schematically depicted in FIG. 5, for example, illustrating the die sections 1, 2 and 5, from right to left as viewed, which are thermally isolated by respective differently structured heat sinks 3. The cutting die sections are of metal. The cutting die section 1 is provided with a knife edge at its tip 1a, which is disposed in close proximity to the tip 2a of the staking die section 2. Each of these tip sections have cavities in which the heating elements H1 and H2 are disposed. These heating elements are electrically insulated from each other and from the metallic die by an insulating material 1b and 2b in which they are embedded. Such a material may be, for example, a ceramic-type material which is an effective electrical insulator while providing thermal conductivity in a sufficient degree to properly heat the tips 1a and 2a. The forming die section 5 is similarly provided with a heating element 5b which is also embedded in an electrical insulating material in a position within the die section 5 adjacent the lower face thereof where the concentration of heat is required for the forming operation. This section of the die is illustrated as being disposed below those sections performing the cutting and staking operations to illustrate that a portion of the film F, between the die section 5 and the base 6, may be stretched by plastic flow to achieve some desired configuration. This is not intended to represent the only way of forming a film, note being made of the blowing and vacuum forming approaches referenced hereinabove.

Two different configurations of heat sinks are described at this point. That heat sink 31 disposed between and spaced from the die sections 1 and 2 is of triangular configuration to conform to the cavity between the die sections 1 and 2. Fluid may be conducted to and from this heat sink 3 by means of a cylindrical cavity 3c, of which there may be several, only one cavity being shown at this location. The alternative configuration 32 of a heat sink 3 shown between and spaced from the die sections 2 and 5, has a hollow cavity conforming roughly to the external configuration of the heat sink. This is advantageous in a sense that it provides a larger fluid volume therewithin and provides better cooling at the lower extremity adjacent the heated tips of the die sections 2 and 5, to provide thermal isolation therebetween.

Figure 7:
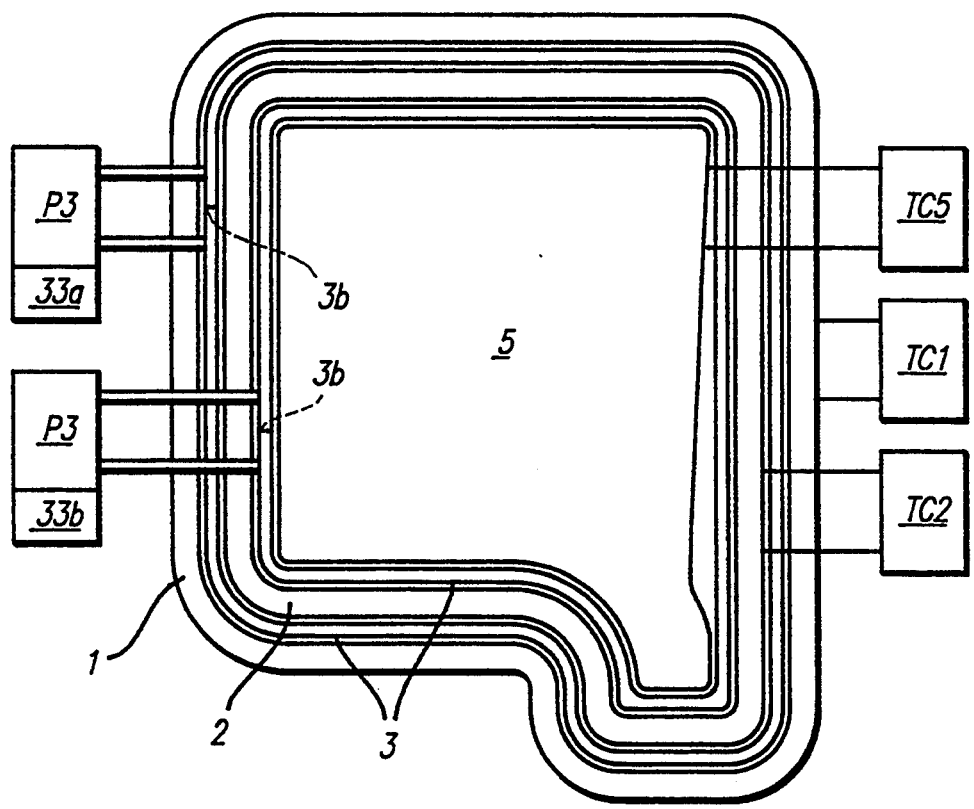
FIGS. 7 and 8 are plan and cross-sectional views, respectively, of a die structure for forming a container such as an ink bladder for a thermal ink jet pen.

FIGS. 7 and 8 illustrate a die structure of a type useful for example in the forming of enclosed containers. This die configuration in planform represents the planform configuration of one type of ink bladder for a thermal ink jet printhead. As seen in the plan view of FIG. 7 and in the cross-sectional view of FIG. 8, this die structure comprises a cutting die section 1, a staking die section 2, and a forming die section 5, for performing cutting, staking and forming operations simultaneously on a pair of plastic films of a configuration suitable for a thermal ink jet ink bladder. The heat sinks 3, respectively, 31a and 32a, are disposed between the die sections 1, 2, and 2, 5 and are connected to respective fluid pumps P3 and heat exchangers, 32a and 33b. While these are shown as separate pumps and heat exchangers, it is apparent that only one of such devices of sufficient capacity may be used to pump fluid in that volume and at that temperature required for both of the heat sinks. The respective die sections 1, 2 and 5, are heated by the respective temperature control systems TC1, TC2 and TC5. Only the power supplies are shown in this illustration in the interest of drawing simplicity, but for temperature control purposes it will be understood that temperature sensors T such as illustrated and discussed with respect to FIG. 1 may be provided.

The cross-sectional view in FIG. 8 illustrates the arrangement of these individual die sections. As before, the die sections are heated by the respective coils or heating elements. The hot die sections 1, 2, 5 and the heat sinks 3 are differently configured than the similar parts of FIG. 6. The hot die sections and the heating elements are here arranged in parallel, requiring thinner heat sinks therebetween. The heat sinks, respectively 31a and 32a, however, again, are of hollow construction so that fluid flow therethrough may be provided. In such an arrangement of the heat sinks, and the same of course applies to those illustrated in FIG. 6, a baffle is provided between the inlet and the outlet pipe connections thereto. This baffle is designated 3b in each heat sink 32a, 32b, in FIG. 7. As apparent from the arrows in FIG. 7, fluid flows through the meat sinks 3 in a counter-clockwise direction. The forming die section 5, as seen in FIG. 8, projects downwardly from the other sections of the die. The base of 6 of the die structure is not continuous beneath the die section 5. Thus the die material itself may be stretched when properly heated due to plastic flow by the downwardly projecting die section 5 to form the desired configuration. If a blowing or vacuum forming operation is to be performed a concave die face is provided on die section 5, and a second similar die section 5 (not shown) having an opposed concave face is disposed between the base sections 6.

I claim:

1. A film die with more than one temperature zone, for fabricating articles of plastic film, comprising:
   first and second die sections at a side of such plastic film for shaping such film; the die sections being generally adjacent to each other but with a space between them;
   means for heating and maintaining the die sections at different selected die temperatures, one of the temperatures being lower than the other, for performing respectively different thermal processing upon such film;
   a heat sink disposed in the space between, and spaced from, the die sections; wherein said heat sink does not shape such film; and
   means for cooling the heat sink to a temperature below the lower temperature of the die sections.

2. The film die of claim 1, wherein:
   the heating means comprises electrical first and second heating elements disposed in heat-exchange relationship with said first and second die sections, respective for maintaining each die section at its respective selected temperature;
   at least one die of the dies has a die tip, for contact with the plastic film, that is relatively narrow in comparison with other portions of the same at least one die that do not contact the plastic film; and
   substantially all the heating elements in said at least one die are disposed in or closely adjacent the die tip to tend to reduce the heat load to be handled by the heat sink.

3. The film die of claim 1 wherein:
   the first die section is a cutting die section and the second die section is a staking die section.

4. The film die of claim 1, wherein:
   the first die section is a cutting die section having a projection with a cutting edge for contact with such plastic film;
   the second die section is a staking die section having a projection including a staking surface for contact with such plastic film; and
   the heat sink comprises a portion disposed between the projections so as to be out of contact with such plastic film.

5. The film die of claim 4, wherein:
   the heat sink comprises at least one coolant passage therein; and
   the cooling means comprise means for circulating a fluid coolant through the at least one passage.

6. The film die of claim 1, particularly for use in fabricating such an article that is a container with an open mouth having a periphery; and wherein:
   each die section has a configuration conforming to such periphery, the configurations being nested one within the other;
   the heat sink has a configuration conforming to such periphery and is disposed between and spaced from the nested die sections;
   the heat sink comprises at least one passage therethrough having an inlet thereto and an outlet therefrom; and
   the cooling means comprise means for supplying a fluid coolant to the inlet and for removing the fluid coolant from the outlet.

7. A film die with more than one temperature zone, for fabricating articles of plastic film, comprising:
   plural die sections at a side of such plastic film for shaping such film; the die sections being successively adjacent but with a space between each adjacent two die sections;
   means for heating and maintaining the die sections at at least two different selected die temperatures, for performing respectively different thermal processing upon such film; and
   thermal guard means for cooling a thermal isolation zone, in the space between each adjacent two die sections, to a temperature below the temperatures of both the adjacent two die sections; wherein the guard means and the isolation zone do not shape such film;
   wherein heat flow from each die section toward any adjacent die section is to the thermal isolation zone rather than to said adjacent die section;
   whereby heating of each die section by heat flow from any adjacent die section is substantially prevented.

* * * * *